US008681395B2

(12) United States Patent  (10) Patent No.: US 8,681,395 B2
Ozawa  (45) Date of Patent: Mar. 25, 2014

(54) IMAGE READING APPARATUS AND IMAGE READING METHOD

(75) Inventor: Kazuyuki Ozawa, Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 36 days.

(21) Appl. No.: 13/420,510

(22) Filed: Mar. 14, 2012

(65) Prior Publication Data

US 2012/0236372 A1 Sep. 20, 2012

Related U.S. Application Data

(60) Provisional application No. 61/453,516, filed on Mar. 16, 2011.

(51) Int. Cl.
H04N 1/04 (2006.01)

(52) U.S. Cl.
USPC ............................ 358/474; 358/475; 358/498

(58) Field of Classification Search
USPC .......................... 358/474, 475, 498, 497, 496
See application file for complete search history.

(56) References Cited

U.S. PATENT DOCUMENTS

2003/0043418 A1*  3/2003  Tsutsumi ...................... 358/412
2008/0175622 A1   7/2008  Hashizume et al.
2009/0103148 A1   4/2009  Murakami
2009/0103934 A1   4/2009  Murakami

* cited by examiner

Primary Examiner — Houshang Safaipour
(74) Attorney, Agent, or Firm — Patterson & Sheridan, L.L.P.

(57) ABSTRACT

According to one embodiment, an image reading apparatus includes a reading unit and an output unit. The reading unit is configured to selectively execute first reading processing for reading an image of a sheet conveyed at first conveying speed at first reading speed corresponding to the first conveying speed and second reading processing for reading the image of the sheet set on an image reading table at second reading speed different from the first reading speed. The output unit is configured to output read image data read by the first reading processing and the second reading processing.

9 Claims, 3 Drawing Sheets

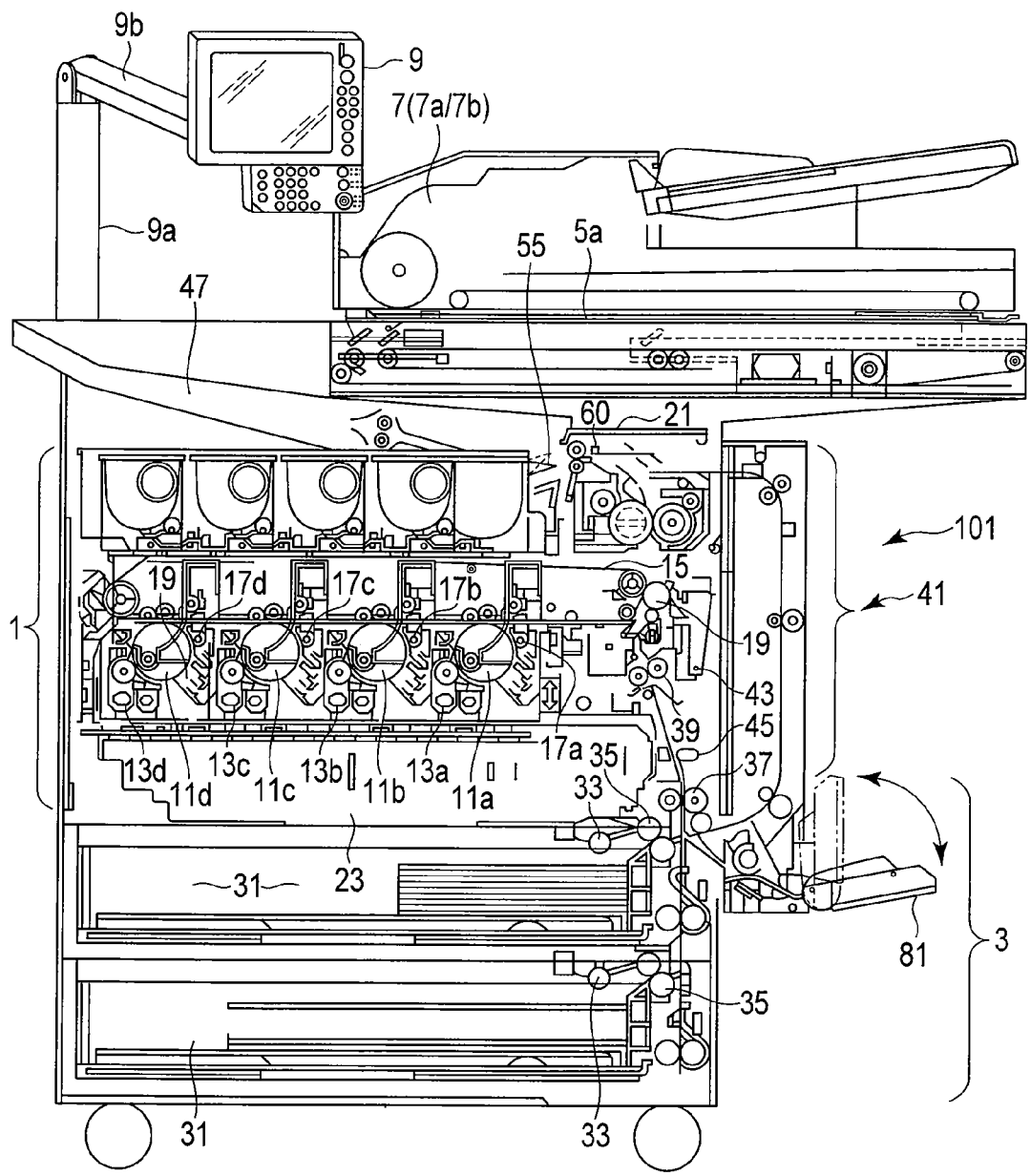
F I G. 1

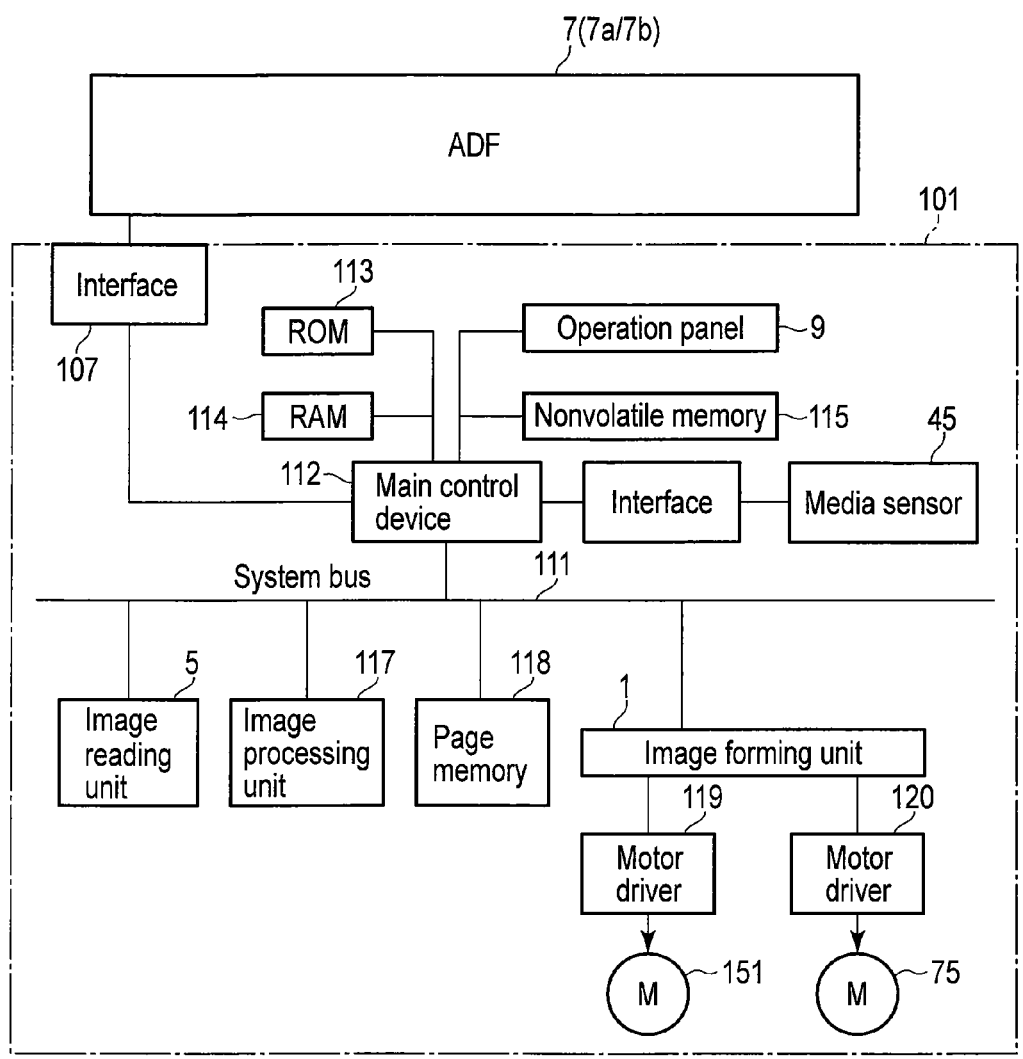
F I G. 2

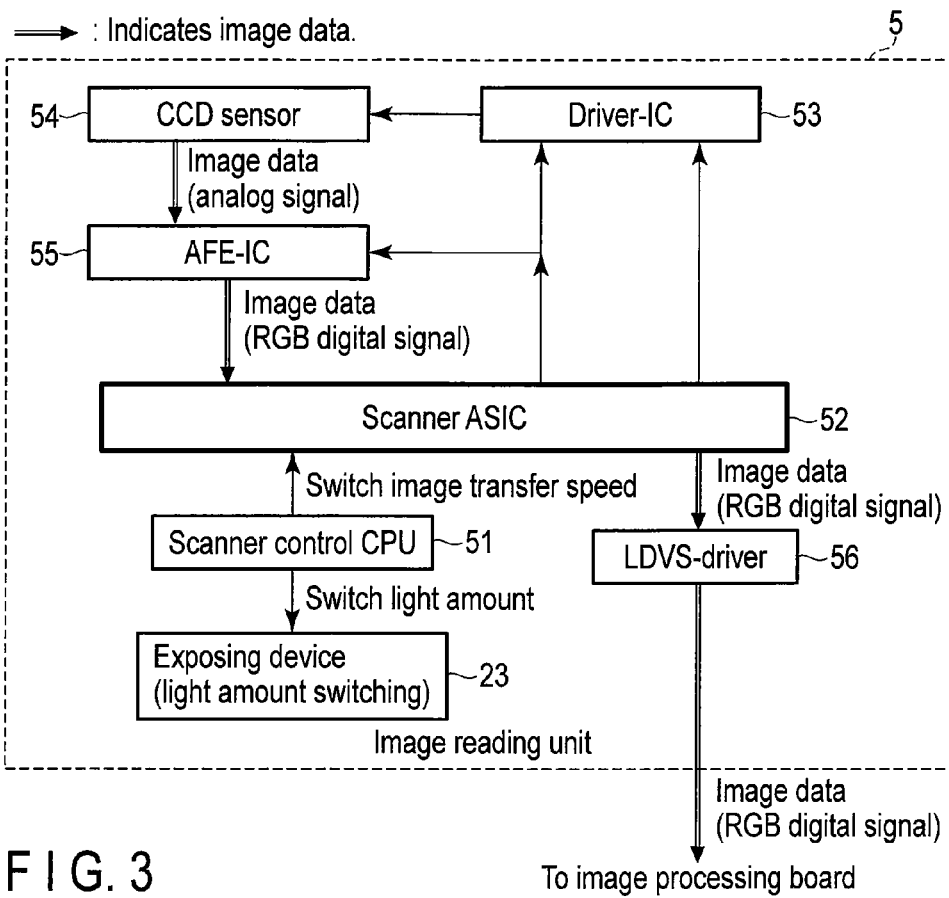
F I G. 3
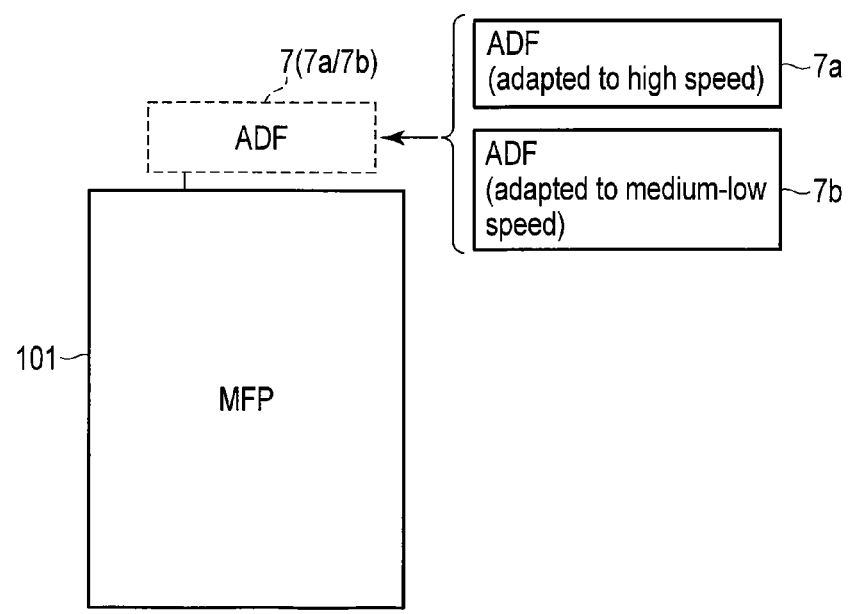
F I G. 4

IMAGE READING APPARATUS AND IMAGE READING METHOD

CROSS-REFERENCE TO RELATED APPLICATIONS

This application is based upon and claims the benefit of priority from U.S. Provisional Application No. 61/453,516, filed on Mar. 16, 2011; the entire contents of which are incorporated herein by reference.

FIELD

Embodiments described herein relate generally to an image reading apparatus and an image reading method.

BACKGROUND

For example, an image reading apparatus can read an image of an original document set on a document table. Further, the image reading apparatus includes an auto document feeder (ADF) and can read an image of an original document conveyed by the ADF. In this way, the image reading apparatus is adapted to two reading systems for reading the set original document and reading the conveyed original document.

In recent years, document conveying speed by an ADF is further increased. An image reading apparatus mounted with a high-speed adapted ADF can quickly read an image of an original document conveyed at high speed by the high-speed adapted ADF. The image reading apparatus mounted with the high-speed adapted ADF is configured to quickly read an image of a set original document. Specifically, in the image reading apparatus adapted to the high speed, two kinds of reading processing for the set original document and a conveyed original document are increased in speed. The speeds of the two kinds of reading processing having the same reading magnification are substantially the same.

On the other hand, there is a need for not only a relatively expensive image reading apparatus adapted to the high speed but also a relatively inexpensive image reading apparatus adapted to medium-low speed. In the image reading apparatus adapted to the medium-low speed, the two kinds of reading processing for the set original document and the conveyed original document are adapted to the medium-low speed. The speeds of the two kinds of reading processing are substantially the same.

This means that, in order to provide the image reading apparatus adapted to the high speed while providing the image reading apparatus adapted to the medium-low speed, a medium-low-speed reading unit for realizing medium-low speed reading processing for the set original document by the image reading apparatus adapted to the medium-low speed and a high-speed reading unit for realizing high-speed reading processing for the set original document by the image reading apparatus adapted to the high speed are separately manufactured and developed. Therefore, loads of the manufacturing, the development, and the like are heavy.

BRIEF DESCRIPTION OF THE DRAWINGS

FIG. 1 is a diagram of an example of an MFP (Multi-Functional Peripheral) according to an embodiment;

FIG. 2 is a diagram of an example of a control system of the MFP shown in FIG. 1;

FIG. 3 is a diagram of an example of an image reading unit in the control system of the MFP shown in FIGS. 1 and 2; and FIG. 4 is a diagram of an example of a state in which two kinds of ADFs can be selectively connected to the MFP shown in FIGS. 1 to 3.

DETAILED DESCRIPTION

In general, according to one embodiment, an image reading apparatus includes a reading unit and an output unit. The reading unit is configured to selectively execute first reading processing for reading an image of a sheet conveyed at first conveying speed at first reading speed corresponding to the first conveying speed and second reading processing for reading the image of the sheet set on an image reading table at second reading speed different from the first reading speed. The output unit is configured to output read image data read by the first reading processing and the second reading processing.

FIG. 1 is a diagram of an example of an MFP (Multi-Functional Peripheral) including an image reading apparatus according to the embodiment.

An MFP 101 shown in FIG. 1 includes an image forming unit 1 that forms an image based on image information on various sheets (plain paper, a transparent resin sheet, etc.) and outputs the image, a sheet feeding unit 3 that feeds a sheet of an arbitrary size, which is used for the image output, to the image forming unit 1, and an image reading unit 5 that captures, as image data, image information to be subjected to the image formation in the image forming unit 1 from a reading target (hereinafter referred to as original document) on which the image information is recorded. In this embodiment, for example, an operation for outputting a sheet on which an image is formed by the image forming unit 1 to the outside, an operation for outputting image data read by the image reading unit 5 to various memories, an operation for transmitting the image data read by the image reading unit 5 to the outside are sometimes collectively referred to as output (image output).

The image reading unit 5 includes a document table (a document reading table) 5a that supports an original document and an image sensor such as a CCD sensor that converts image information into image data. The image reading unit 5 converts, with the CCD sensor, reflected light obtained by irradiating illumination light from a lighting device on an original document set (manually set) on the document table 5a into an image signal and reads an image of the original document.

Alternatively, the document reading unit 5 converts, with the CCD sensor, reflected light obtained by irradiating the illumination light from the lighting device on an original document conveyed by an auto document feeder (ADF) 7 (7a or 7b) into an image signal and reads an image of the original document. For example, the CCD sensor of the image reading unit 5 is located in a moving path of the original document conveyed by the ADF 7. The CCD sensor can read the image of the original document without leading the original document to the document table 5a. When the image of the original document is read by the ADF 7, reading speed depends on conveying speed of the original document by the ADF 7.

The ADF 7 picks up a first original document from set plural original documents, conveys the first original document, leads the first original document to a document reading position, and discharges the first original document that passes the document reading position. Following the pickup of the first original document, the ADF 7 picks up a second original document, leads the second original document to the document reading position, and discharges the second original document that passes the document reading position.

The MFP 101 may be configured to include the ADF 7 (7a or 7b) or may be configured to include a document cover instead of the ADF 7. In this embodiment, the MFP 101 including the ADF 7 (e.g., the ADF 7a) is mainly explained. However, the ADF 7 (7a or 7b) may be an option of the MFP 101. The MFP 101 can be connected to one of the ADFs 7a and 7b.

An operation panel (an operation unit) 9, which is an operation input unit that gives an instruction for starting reading of image information of an original document by the image reading unit 5 and an instruction for starting image formation by the image forming unit 1, is located in a column 9a (fixed to the image forming unit 1) and a swing arm 9b at a corner on the left side, the right side, or the like of the image reading unit 5. For example, when the instruction for the start of the reading is input from the operation panel 9 in a state in which an original document set on the document table 5a is detected, reading processing for the original document set on the document table 5a is executed. When the instruction for the start of the reading is input from the operation panel 9 in a state in which an original document set on the ADF 7 is detected, the original document set on the ADF 7 is conveyed and the reading processing is executed on the conveyed original document.

The image forming unit 1 includes first to fourth photoconductive drums 11a to 11d that bear latent images, developing devices 13a to 13d that supply developers, i.e., toners to the latent images born by the photoconductive drums 11a to 11d and develop the latent images, a transfer belt 15 that bears, in order, toner images born by the photoconductive drums 11a to 11d, first to fourth cleaners 17a to 17d that remove the toners remaining on the photoconductive drums 11a to 11d from the respective photoconductive drums 11a to 11d, a transfer device 19 that transfers the toner images born by the transfer belt 15 onto plain paper or a sheet, which is a transparent resin sheet such as an OHP sheet, a fixing device 21 that fixes the toner images, which are transferred onto the sheet by the transfer device 19, on the sheet, and an exposing device 23 that forms the latent images on the photoconductive drums 11a to 11d.

The first to fourth developing devices 13a to 13d store toners of arbitrary colors of Y (yellow), M (magenta), C (cyan), and Bk (black) used for obtaining a color image through subtractive mixture of colors. The first to fourth developing devices 13a to 13d visualize the latent images born by the respective photoconductive drums 11a to 11d in any colors of Y, M, C, and Bk. The order of the colors is determined in predetermined order according to an image forming process and characteristics of the toners.

The transfer belt 15 bears the toner images of the respective colors, which are formed by the first to fourth photoconductive drums 11a to 11d and the developing devices 13a to 13d corresponding the first to fourth photoconductive drums 11a to 11d, in the order of the formation of the toner images.

The transfer belt 15 receives predetermined pressure, which is tension acting toward the outer side, from each of a belt opposed member 51 that sets pressure between the photoconductive drums 11a to 11d and the transfer belt 15 of the image forming unit 1, a belt cleaner opposed member 55 that sets pressure applied by a belt cleaner 53 that cleans the surface of the transfer belt 15, and a support roller 57 that sets pressure on the transfer belt 15 side applied when a sheet is brought into contact with the transfer belt 15 by pressure from the transfer device 19.

The sheet feeding unit 3 feeds a sheet, onto which the toner images are transferred, to the transfer device 19 at predetermined timing.

Cassettes, which are not explained in detail herein, located in plural cassette slots 31 store sheets of arbitrary sizes. Pickup rollers 33 pick up the sheets from the cassettes corresponding to the pickup rollers 33 according to the image forming operation. The sizes of the sheets correspond to magnifications requested in image formation and the sizes of toner images formed by the image forming unit 1.

A separating mechanism 35 prevents two or more sheets from being picked up from the cassette by the pickup roller 33 at a time.

Plural conveying rollers 37 convey one sheet separated by the separating mechanism 35 to an aligning roller 39.

The aligning roller 39 sends the sheet to a transfer position, where the transfer device 19 and the transfer belt 15 are in contact with each other, to be timed to coincide with the transfer of the toner images from the transfer belt 15 by the transfer device 19.

The fixing device 21 fixes the toner images corresponding to the image information on the sheet and sends the sheet to a stock unit 47, which is located in a space between the image reading unit 5 and the image forming unit 1, as an image output (a hard copy or a printout).

The transfer device 19 is located in an automatic duplex unit (ADU) 41 that replaces both sides of the sheet, which is the image output (the hard copy or the printout), on which the toner images are fixed by the fixing device 21. A bypass tray is attached to the ADU 41.

The ADU 41 moves to a side (the right side) when the sheet jams between the (last) conveying roller 37 and the aligning roller 39 or between the aligning roller 39 and the fixing device 21 or between the transfer device 19 and the fixing device 21 in the image forming unit 1. The ADU 41 integrally includes a cleaner 43 that cleans the transfer device 19.

A media sensor 45 located between the conveying roller 37 and the aligning roller 39 detects the thickness of the sheet conveyed to the aligning roller 39. As the media sensor 45, it is possible to use the optical sensor disclosed in U.S. patent application Ser. No. 12/197,880 filed on Aug. 25, 2008 and U.S. patent application Ser. No. 12/199,424 filed on Aug. 27, 2008 and/or the sensor of the type that uses a shift of a thickness detection roller disclosed in U.S. Provisional Application No. 61/043,801 filed on Apr. 10, 2008.

FIG. 2 is a diagram of an example of a control system of the MFP shown in FIG. 1.

The MFP 101 includes a system bus 111. The system bus 111 is connected to a main control device 112 that controls document formation processing by the image forming unit 1 and image reading processing by the image reading unit 5. The MFP 101 includes the image reading unit 5 and an image processing unit 117. The MFP 101 includes a motor driver 119 that supplies a pulse for rotating a stepping motor 151. A rotation angle of the stepping motor 151 is specified by the number of pulses. The stepping motor 151 rotates the first to fourth photoconductive drums 11a to 11d. The MFP 101 includes a motor driver 120 that supplies a pulse for rotating a stepping motor 75. A rotation angle of the stepping motor 75 is specified by the number of pulses. The main control device 112 is connected to a ROM (Read Only Memory) 113, a RAM (Random Access Memory) 114, a nonvolatile memory 115 that stores a total number of formed images, a total operation time, and the like, an interface 116 that inputs an output of the media sensor 45 to the main control device 112, and the operation panel 9. The image processing unit 117 is connected to a page memory 118.

Further, the main control device 112 is connected to an interface 107 and connected to the ADF 7 (7a or 7b) via the interface 107. The main control device 112 receives various kinds of information from the ADF 7 (7a or 7b) via the interface 107. For example, when the ADF 7a is connected to the interface 107 as shown in FIG. 4, the ADF 7a transmits identification information, performance information, and the like of the ADF 7a to the main control device 112 via the interface 107. Further, when the ADF 7a detects that a sheet is set thereon, the ADF 7a transmits a sheet detection signal to the main control device 112 via the interface 107.

Similarly, if the ADF 7b is connected to the interface 107 as shown in FIG. 4, the ADF 7b transmits identification information, performance information, and the like of the ADF 7b to the main control device 112 via the interface 107. Further, when the ADF 7b detects that a sheet is set thereon, the ADF 7b transmits a sheet detection signal to the main control device 112 via the interface 107.

As explained above, the ADF 7a or 7b transmits the various kinds of information to the main control device 112 via the interface 107. The main control device 112 transmits the various kinds of information to the image reading unit 5. The image reading unit 5 (a scanner control CPU 51) can detect, on the basis of the various kinds of information, for example, that the ADF 7a or 7b is connected and that the sheet is set on the ADF 7a or 7b.

FIG. 3 is a diagram of an example of a schematic configuration of the image reading unit 5. As shown in FIG. 3, the image reading unit 5 includes the scanner control CPU 51, a scanner ASIC 52, a driver-IC 53, a CCD sensor 54, an AFE-IC 55, the exposing device 23, and an LDVS-driver 56. The main control device 112 and the scanner control CPU 51 switch first reading processing, second reading processing, and third reading processing explained later in cooperation with each other.

For example, the scanner control CPU 51 can select (set), according to the detection of the connection of the ADF 7a, reading processing corresponding to the performance of the ADF 7a and select (set), according to the detection of the connection of the ADF 7b, reading processing corresponding to the performance of the ADF 7b.

For example, the ADF 7a includes four conveying motors and can convey the sheet at high speed (e.g., 330 mm/sec). The ADF 7b includes three conveying motors and can convey the sheet at medium-low speed (e.g., 210 mm/sec). The scanner control CPU 51 can select (set), according to the detection of the connection of the ADF 7a and the detection of an original document set on the ADF 7a, reading processing (the first reading processing) corresponding to the performance of the ADF 7a. The scanner control CPU 51 can select (set), according to the detection of the connection of the ADF 7b and the detection of an original document set on the ADF 7b, reading processing (the third reading processing) corresponding to the performance of the ADF 7b. The scanner control CPU 51 can select (set), according to the detection of an original document set on the document table 5a, reading processing (the second reading processing) corresponding to carriage performance of a lighting device (a light source). In this way, the scanner control CPU 51 is adapted to both of reading of the original document set on the document table 5a and reading of the original document conveyed by the ADF 7a or 7b.

For example, the scanner control CPU 51 executes, on the basis of the detection of the connection of the ADF 7a, the detection of the sheet set on the ADF 7a, and the detection of the instruction for the start of the reading (including designation of a predetermined magnification (e.g., 100%)), first reading processing for reading an image of an original document conveyed at first conveying speed (the high speed) by the ADF 7a at first reading speed corresponding to the first conveying speed. According to the execution of the first reading processing by the scanner control CPU 51, the exposing device 23 executes the first reading processing by executing first exposure processing for exposing the original document with a first light amount corresponding to the first reading speed. The scanner ASIC 52 transfers (outputs) read image data detected by the CCD sensor 54 at first image transfer speed corresponding to the first reading speed.

The scanner control CPU 51 executes, on the basis of the detection of the original document set on the document table 5a and the detection of the instruction for the start of the reading (including the designation of the predetermined magnification (e.g., 100%)), second reading processing for reading an image of the original document set on the document table 5a at second reading speed. According to the execution of the second reading processing by the scanner control CPU 51, the exposing device 23 executes the second reading processing by executing second exposure processing for exposing the original document with a second light amount (<the first light amount) corresponding to the second reading speed (<the first reading speed). The scanner ASIC 52 transfers (outputs) read image data detected by the CCD sensor 54 at second image transfer speed corresponding to the second reading speed.

Alternatively, the scanner control CPU 51 executes, on the basis of the detection of the connection of the ADF 7b, the detection of the sheet set on the ADF 7b, and the detection of the instruction for the start of the reading (including the designation of the predetermined magnification (e.g., 100%)), third reading processing for reading an image of an original document conveyed at second conveying speed (the medium-low speed) by the ADF 7b at second reading speed corresponding to the second conveying speed. According to the execution of the third reading processing by the scanner control CPU 51, the exposing device 23 executes third reading processing by executing the second exposure processing for exposing the original document with the second light amount (<the first light amount) corresponding to the second reading speed (<the first reading speed). The scanner ASIC 52 transfers (outputs) read image data detected by the CCD sensor 54 at the second image transfer speed corresponding to the second reading speed.

As explained above, the MFP 101 reduces a light amount in reading the image of the original document at the medium-low speed (the light amount of the second reading processing and the third reading processing) to be smaller than a light amount in reading the image of the original document at the high speed (the light amount of the first reading processing) such that an input light amount to the CCD sensor 54 is not saturated. In this way, the MFP 101 appropriately controls (switches) an exposure light amount and appropriately controls (switches) image transfer speed. Consequently, the MFP 101 can read the image of the original document using the ADF 7a at the same reading magnification and different reading speeds and read the image of the original document set on the document table (the document reading table) 5a. Specifically, the MFP 101 can read the image of the original document at the high speed using the ADF 7a and can also read the image of the original document set on the document table 5a at standard speed (the medium-low speed) at the same reading magnification. In other words, the MFP 101 reads the image of the original document set on the document table (the document reading table) 5a at speed lower than speed for reading the image on the original document using the ADF 7a.

The reading speed of the original document read by the ADF 7b and the reading speed of the original document set on the document table (the document reading table) 5a are set substantially the same.

Therefore, the image reading unit 5 of the MFP 101 including the ADF 7a adapted to the high speed and the image reading unit 5 of the MFP 101 including the ADF 7b adapted to the standard speed (adapted to the medium-low speed) can be used in common. In other words, the image reading unit 5 of the MFP 101 including the ADF 7a adapted to the high speed and the image reading unit 5 of the MFP 101 including the ADF 7b adapted to the standard speed (adapted to the medium-low speed) do not have to be separately developed.

Consequently, in expanding product lines, the image reading apparatus for the high speed and the image reading apparatus for the medium-low speed do not have to be separately developed. Therefore, it is possible to, for example, reduce development expenses and share a manufacturing process, and reduce manufacturing costs.

In general, the MFP including the ADF adapted to the high speed is configured to read the original document set on the document table at the high speed as well. The MFP including the ADF adapted to the standard speed (adapted to the medium-low speed) is configured to read the original document set on the document table at the standard speed (the medium-low speed) as well. Therefore, an increase in speed is realized concerning the reading of the original document set on the document table to correspond to an increase in the speed of the ADF.

Actually, even the MFP in recent years adapted to the standard speed (the medium-low speed) is relatively fast. When time in which a user sets an original document on the document table is taken into account, the standard speed (the medium-low speed) is sufficient in the reading performed by using the document table.

The image reading unit 5 of the MFP according to this embodiment is configured to be adaptable to the different reading speeds. Therefore, it is possible to cope with, flexibly and at low cost, an increase in the speed of reading performed by using the ADF. In other words, the image reading unit 5 of the MFP according to this embodiment can cope with the ADF 7a adapted to the high speed, can cope with the ADF 7b adapted to the medium-low speed, and can cope with reading of an original document set on the document table adapted to the medium-low speed.

As explained above, the MFP according to this embodiment can appropriately control (switch) the two kinds of reading speeds, light amounts, and image transfer speeds and can also appropriately control (switch) three or more kinds of reading speeds, light amounts, and image transfer speeds.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading apparatus comprising:
   a reading unit configured to selectively execute a first reading processing including reading, at a first reading speed, an image of a sheet conveyed at first conveying speed, and a second reading processing including reading an image of a sheet set on an image reading table at second reading speed lower than the first reading speed; and
   an output unit configured to output image data read by the reading unit executing the first reading processing and the second reading processing,
   wherein the reading unit is configured to execute the first reading processing with a first light amount, and execute the second reading processing with a second light amount smaller than the first light amount.

2. The apparatus according to claim 1, wherein the reading unit is configured to execute the first reading processing and the second reading processing corresponding to the first and second reading speeds at a same reading magnification.

3. The apparatus according to claim 1, wherein the reading unit is configured to execute the first reading processing by executing a first exposure processing for exposing the sheet with the first light amount, and execute the second reading processing by executing a second exposure processing for exposing the sheet with the second light amount.

4. The apparatus according to claim 1, wherein the reading unit is configured to execute the first reading processing by executing a first exposure processing for exposing the sheet with the first light amount at the first reading speed, and execute the second reading processing by executing a second exposure processing for exposing the sheet with the second light amount at the second reading speed.

5. The apparatus according to claim 1, wherein the reading unit is configured to execute the first reading processing according to a detection that the sheet is set in a first conveying unit that conveys the sheet at the first conveying speed, and execute the second reading processing according to a detection that the sheet is set on an image reading table.

6. An image reading apparatus comprising:
   a reading unit configured to selectively execute a first reading processing including reading, at a first reading speed, an image of a sheet conveyed at a first conveying speed, and a second reading processing including reading an image of a sheet set on an image reading table at a second reading speed different from the first reading speed;
   an output unit configured to output image data read by the reading unit executing the first reading processing and the second reading processing; and
   a detecting unit configured to detect connection of a first conveying unit that conveys a sheet at the first conveying speed or connection of a second conveying unit that conveys a sheet at a second conveying speed lower than the first conveying speed, wherein
   the reading unit selects the first reading processing based on the detection of the connection of the first conveying unit and selects a third reading processing based on the detection of the connection of the second conveying unit, and
   the third reading processing includes reading an image of a sheet conveyed by the second conveying unit at a third reading speed.

7. The apparatus according to claim 6, wherein the reading unit executes the first reading processing by executing a first exposure processing for exposing the sheet with the first light amount at the first reading speed, executes the second reading processing by executing a second exposure processing for exposing the sheet with the second light amount at the second reading speed, and executes the third reading processing by executing the second exposure processing.

8. The apparatus according to claim 1, further comprising a first conveying unit configured to convey the sheet at the first conveying speed.

9. The apparatus according to claim 6, wherein the third reading speed is substantially the same as the second reading speed.

* * * * *